_United States Patent_ [19]

Neri et al.

[11] Patent Number: 4,992,220
[45] Date of Patent: Feb. 12, 1991

[54] METHOD FOR PRODUCING BIODEGRADABLE PACKAGING MATERIAL

[76] Inventors: Michael A. Neri, 48 Flatt Rd., Rochester, N.Y. 14623; Joseph R. DeGeorge, 53 Cascade Rd., W. Henrietta, N.Y. 14586; William J. Every, 1619 Brighton-Henrietta T.L. Rd., Rochester, N.Y. 14623

[21] Appl. No.: 370,282

[22] Filed: Jun. 23, 1989

[51] Int. Cl.$^5$ ............................................. B29C 39/38
[52] U.S. Cl. ......................................... 264/28; 383/1
[58] Field of Search ............................. 264/28; 383/1; 229/87.08

[56] References Cited

U.S. PATENT DOCUMENTS

| | | | |
|---|---|---|---|
| 3,551,535 | 12/1970 | Henderson et al. | 264/28 |
| 4,279,812 | 7/1981 | Cioca | 264/28 |
| 4,312,979 | 1/1982 | Takemoto et al. | 435/72 |
| 4,472,542 | 9/1984 | Nambu | 264/28 |
| 4,849,141 | 7/1989 | Fujioka et al. | 264/28 |
| 4,925,603 | 5/1990 | Nambu | 264/28 |

_Primary Examiner_—David Simmons
_Assistant Examiner_—Allan R. Kuhns
_Attorney, Agent, or Firm_—Shlesinger Fitzsimmons Shlesinger

[57] ABSTRACT

A mixture of boiling water and a gelling agent, such as the polysaccharide agar, are mixed and poured into a mold and allowed to cool and gel. The gelled mixture is then removed from the mold and frozen, after which it is placed in a freeze drier where it is completely sublimated to remove therefrom all moisture. The resultant freeze dried material is extremely light in weight, is biodegradable, and exhibits favorable fire retardant properties.

5 Claims, No Drawings

METHOD FOR PRODUCING BIODEGRADABLE PACKAGING MATERIAL

BACKGROUND OF THE INVENTION

This invention relates to packaging materials, and more particularly to an improved packaging material which, upon being disposed, will degrade over a relatively brief period of time upon being exposed to the elements—i.e., water, insects, fungi, etc. More particularly this invention relates to a novel process for producing such packaging material.

The extensive use of synthetic plastics for packaging and wrapping materials has caused a proliferation of the environment with refuse which defies disposal short of incineration. Even then, incineration of disposed plastic items tends simply to redistribute the pollution from the earth to the atmosphere. Waste disposal, therefore, has become a national crisis, particularly in the larger metropolitan areas. Unfortunately, the populated areas often seek to solve the waste problem by transporting their waste to the more rural areas, thus generating also social-political problems.

Numerous efforts have been made to combat this problem by developing biodegradable materials which can be substituted in place of the heretofore non-biodegradable plastics so often employed for packaging materials such as wrapping films, shipping boxes, containers, and the like. U.S. Pat. No. 3,921,333, for example, suggests that the problem can be at least partially solved by using synthetic plastic materials which are biodegradable—i.e., thermoplastic polymers which can be degraded by living organisms, usually microorganisms.

The U.S. Pat. No. 4,312,979 discloses various methods for preparing polysaccharides by extracellular cultivation from the genus Pseudonomas in a nutrient medium. Although the patent does not disclose or teach the production of a packaging or wrapping material, it does suggest that polysaccharides can be used as moldable materials for biodegradable films, as well as for other purposes.

Accordingly, one object of this invention is to provide a novel method of producing a biodegradable packaging material from a gellable plant extract, such as for example from a polysaccharide such as agar-agar.

Still a more specific object of this invention is to provide a novel method of producing a biodegradable packaging material by freeze drying a liquid mixture containing a polysaccharide gelling agent.

Other objects of the invention will be apparent hereinafter from the specification and from the recital of the appended claims.

SUMMARY OF THE INVENTION

The novel, biodegradable packaging material is produced by mixing a gellable plant extract, such as agar-agar (a.k.a. agar) in boiling water, and pouring the mixture, while in liquid state, into one or more molds having the desired shape of the packaging material that is to be produced—e.g., in the shape of spheres, cubes or any other desired configuration. The mixture is allowed to cool and gel in the mold, after which it is frozen, either in the mold, or after being removed from the mold. After reaching a frozen state the material is subjected to a sublimation process for completely subliming (removing) substantially all moisture from the frozen material. The resulting material will constitute a biodegradable packaging material which at room temperature is very light and has the consistency of, for example, urethane foam.

PREFERRED EMBODIMENT OF THE INVENTION

By way of example, a quantity of agar is added to boiling water in the ratio of, for example, one liter of boiling water to fifteen grams of agar. The mixture is then stirred or otherwise mixed until the agar dissolves in the water. The resulting solution, while still in a liquid state, is then poured into one or more molds, the cavities of which have the desired shape of the packaging material that is to be produced. For example, the mold cavities may be approximately spherical in shape, or may each be in the shape of a cube, or may have any other desired configuration. After the solution has cooled and gelled in the mold or molds, and have thus reached the desired shapes, the gelled mixtures are removed from the molds and frozen, or alternatively, are frozen within the molds and thereafter are removed.

In any event, after having been frozen, the frozen mixtures are placed in the vacuum chamber of a conventional freeze drier, and are subjected to a freeze drying operation until each molded mixture is completely sublimated of all moisture. The resultant, freeze dried products will retain their molded configurations upon reaching room temperature, and will be extremely light in weight, and will have a consistency generally similar to that of a urethane foam.

Depending upon the density desired, the amount of gelling agent dissolved in a given amount of water can be varied without departing from this invention. In other words, the greater the amount of gelling agent dissolved in a given amount of water, the greater will be the density of the freeze dried product. Polysaccharides from plants appear to work best in the above-noted process. Bacto-agar used as a culture media works extremely well as a gelling agent because of its high bloom factor, which is a measure of the gel strength. This bacto-agar is purified to remove most extraneous matter, pigmented portions and salts. Similar results can be achieved by using gellan gum, a highly purified polysaccharide, gelatine, agar and selose agar-agar.

The above-noted freeze dried mixtures are biodegradable following a period of exposure to water and microorganisms commonly found in our environment. Moreover, the freeze dried packaging material disclosed herein exhibits fire retardant properties, because it flames only briefly and then smolders out.

From the foregoing it will be apparent that the present invention provides a relatively simple and inexpensive packaging material, which has the advantage, as compared to existing plastic packaging materials, that it will tend to degrade when disposed of in such manner that it will be exposed to the elements—i.e., water, bacteria, etc. By freeze drying the frozen gelling agent, the packaging material is rendered not only biodegradable, but also extremely light in weight, which renders it particularly suitable for use in mailing or otherwise transporting various packages.

While the invention has been described in connection with only certain gelling agents, such as plant extracts and gums of the polysaccharide variety, it is to be understood that similar such biodegradable gelling agents can be employed without departing from this invention. Moreover, while this invention has been described in connection with only certain embodiments thereof, it will be apparent that it is capable of still further modification, and that this application is intended to cover any such modifications as may fall within the scope of one skilled in the art or the appended claims.

We claim:

1. A method for producing a freeze-dried, lightweight, biodegradable packaging product which at room temperature has the consistency of, for example, urethane foam, comprising boiling a quantity of water, mixing a quantity of gellable plant extract with the boiling water to form a moldable solution, pouring said solution into at least one mold and allowing the solution to cool, freezing the molded solution, and subjecting the frozen solution to a sublimation process to completely sublimate all moisture therefrom, and to produce a biodegradable product which will retain its molded configuration upon reaching room temperature.

2. A method as defined in claim 1, wherein said gellable plant extract is a polysaccharide having a high bloom factor.

3. A method as defined in claim 2, wherein said polysaccharide is selected from the group consisting of bacto-agar, gellan gum, gelatine, agar and selose agar-agar.

4. A method as defined in claim 1, wherein the ratio of water to plant extract is increased and decreased, selectively, depending upon the desired density of the packaging material.

5. A method as defined in claim 4, wherein the ratio of water to plant extract is in the range of fifteen grams of plant extract to one liter of water.

* * * * *